(12) United States Patent
An

(10) Patent No.: US 10,400,927 B2
(45) Date of Patent: Sep. 3, 2019

(54) EARTHQUAKE-RESISTANT FLEXIBLE SLIP JOINT APPARATUS

(71) Applicant: Chang Yup An, Seongnam-si (KR)

(72) Inventor: Chang Yup An, Seongnam-si (KR)

(73) Assignee: Chang Yup An (KR)

( * ) Notice: Subject to any disclaimer, the term of this patent is extended or adjusted under 35 U.S.C. 154(b) by 104 days.

(21) Appl. No.: 15/702,849

(22) Filed: Sep. 13, 2017

(65) Prior Publication Data

US 2018/0106404 A1      Apr. 19, 2018

(30) Foreign Application Priority Data

Oct. 13, 2016   (KR) .......................... 10-2016-0132854

(51) Int. Cl.
  *F16L 27/12*   (2006.01)

(52) U.S. Cl.
  CPC ........... *F16L 27/12* (2013.01); *F16L 2201/20* (2013.01)

(58) Field of Classification Search
  CPC ....... F16L 27/12; F16L 27/125; F16L 27/026; F16L 27/107; F16L 27/108; F16L 27/1085; F16L 27/11; F16L 27/111
  See application file for complete search history.

(56) References Cited

U.S. PATENT DOCUMENTS

| | | | | |
|---|---|---|---|---|
| 4,109,097 A * | 8/1978 | Berry | ..................... | F16L 25/01 174/78 |
| 6,056,329 A * | 5/2000 | Kitani | ................... | F16L 27/026 285/145.3 |
| 6,145,846 A | 11/2000 | Slack et al. | | |
| 6,257,625 B1 * | 7/2001 | Kitani | ................... | F16L 27/026 285/145.3 |
| 2004/0040606 A1 * | 3/2004 | Bekki | ................... | F16L 27/026 138/120 |
| 2004/0096265 A1 * | 5/2004 | Inoue | ..................... | F16L 27/12 403/185 |
| 2014/0097613 A1 * | 4/2014 | Ikeda | ................... | F16L 27/026 285/302 |

(Continued)

FOREIGN PATENT DOCUMENTS

| | | |
|---|---|---|
| CN | 104633363 | 5/2015 |
| JP | 58060088 | 4/1983 |
| JP | 11210965 | 8/1999 |

(Continued)

*Primary Examiner* — James M Hewitt, II
(74) *Attorney, Agent, or Firm* — Perman & Green, LLP

(57) ABSTRACT

An earthquake-resistant flexible slip joint apparatus includes a joint outer part including an outer portion, an end connection portion, and an inner portion, and a slip inner part, wherein a pressurizing space is formed to be surrounded by the outer portion, the end connection portion, and the inner portion of the joint outer part, the inner portion includes a packing portion at a region thereof spaced apart from the end connection portion, the inner portion further includes an inner crimped portion and the packing portion, and an adhesion between the inner portion and the slip inner part increases due to a pressure of a conveyed fluid, the pressure being applied via the pressurizing space, and the inner crimped portion is elastically deformed when the slip inner part moves in up, down, left, and right directions, so that the conveyed fluid does not leak to the outside.

6 Claims, 4 Drawing Sheets

(56) References Cited

U.S. PATENT DOCUMENTS

2015/0338003 A1* 11/2015 Saito ................. F16L 27/12
                                                   285/261

FOREIGN PATENT DOCUMENTS

| JP | 3487787 B2 * | 1/2004 | ............ F16L 27/12 |
| KR | 20080010487 | 1/2008 | |
| KR | 101386663 | 4/2014 | |

* cited by examiner

EARTHQUAKE-RESISTANT FLEXIBLE SLIP JOINT APPARATUS

CROSS-REFERENCE TO RELATED APPLICATION

This application claims the benefit of Korean Patent Application No. 10-2016-0132854, filed on. Oct. 13, 2016, in the Korean Intellectual Property Office, the disclosure of which is incorporated herein in its entirety by reference.

BACKGROUND

1. Field

One or more embodiments relate to an earthquake-resistant flexible slip joint apparatus, and more particularly, to an earthquake-resistant flexible slip joint apparatus capable of flexibly allowing up, down, left, and right movements which may be caused by an earthquake or other factors and thus having enhanced durability.

2. Description of the Related Art

Generally, pipelines to convey fluids, such as hot water, oil, gases, vapors, etc., are installed in various industrial plants, power plants, buildings, apartments, large vessels, etc. The pipelines may be deformed, for example, expanded, contracted, or twisted, due to various factors, such as a temperature difference between a conveyed fluid and external bodies, a change in pressure, an earthquake, wind gusts, etc. In this case, if there is no countermeasure, stress concentration and accumulation in a connection portion of the pipes may cause cracks in the connection portion, which may result in leakage of a fluid. Particularly, when a large shock occurs, for example, in the case of an earthquake, the deformation extent could be quite large, which increases the probability of fluid leakage.

Therefore, when the pipelines are installed, it is inevitably necessary to install a flexible joint in the connection portion of the pipes to protect the pipes from excessive movements by absorbing excessive stress caused by deformation, such as expansion, contraction, twisting, etc., the deformation occurring due to external bodies, a change in temperature and pressure of a conveyed fluid, earthquakes, wind gusts, etc.

Conventionally, a bellows-type flexible joint connected between the pipes via a bellows-type crimped pipe has been widely used as a flexible joint for absorbing an elastic deformation of the pipes.

However, although this conventional bellows-type flexible joint has a simple structure and low installation costs, it has limited elasticity and a little elastic length compared to its total length, and thus, the scope of its applicability is extremely limited. Also, since both ends thereof are fixed between the pipes, the conventional bellows-type flexible joint could easily break when twisting thereof occurs due to a rotational force, and is not capable of allowing with up, down, left, and right movements.

Another conventional slip joint includes an outer part, an inner part which is formed to be capable of undergoing a slip motion into the outer part, and various packing portions at a surface at which the outer part and the inner part contact each other to prevent leakage of a conveyed fluid. However, this conventional slip joint may not effectively allow up, down, left, and right movements or a twisting movement.

In addition to the slip joint, a complex joint including a slip joint and a ball joint or just a ball joint has been proposed in order to sustain external forces applied thereto from up, down, left, and right directions in various ways.

However, this conventional complex joint has many problems. For example, a conveyed fluid may leak through a gap between an outer part and a slip part, due to limitations or complex types of a structure of the conventional complex joint. Also, this complex joint is difficult and expensive to manufacture, and additionally, the maintenance thereof is complicated.

These problems were addressed to some extent by registered patent KR 10-1386663 granted to the present applicant. FIG. 1 is the main figure of this patent publication, and FIG. 2 is a cross-sectional view for describing a case in which a slip inner part 102 moves in up, down, left, and right directions as relative motions with respect to an outer part 101.

By using the pressure of a conveyed fluid, a pressurizing space (A) makes a packing portion and an external surface of the slip inner part 102 adhere to each other, and thus, the leakage of the conveyed fluid is effectively blocked. Also, when the slip inner part 102 moves in up, down, left, and right directions due to an external force applied thereto, a vertical end 112 is elastically deformed to allow movements of the slip inner part 102.

However, the conventional art has problems that need to be solved.

That is, since a packing member 130 and auxiliary packings 131 are arranged in a lengthwise direction throughout an inner portion 113, when the vertical end 112 has to be elastically deformed to allow up, down, left, and right movements of the slip inner part 102, which are continually performed, stress is accumulated in the vertical end 112, which results in damage to the vertical end 112. Also, when a large external force such as when an earthquake occurs, deformation of the vertical end 112 is not sufficient to offset the effects of the external force, and thus, damage may occur to the vertical end 112 or other portions, which may result in leakage of the conveyed fluid.

SUMMARY

One or more embodiments include an earthquake-resistant flexible slip joint apparatus capable of not only preventing leakage of a conveyed fluid through a gap between an outer part and an inner part, but also allowing large and repetitive up, down, left, and right movements of a connected pipe due to an external force, such as an earthquake, etc., via elastic deformation of an inner crimped portion.

Additional aspects will be set forth in part in the description which follows and, in part, will be apparent from the description, or may be learned by practice of the presented embodiments.

According to one or more embodiments, an earthquake-resistant flexible slip joint apparatus includes: a joint outer part including an outer portion having a cylindrical shape, an end connection portion extending from an end of the outer portion toward a center of the joint outer part, and an inner portion extending from an end of the end connection portion toward an inside of the joint outer part and having a free end; and a slip inner part having a cylindrical shape and mounted to be capable of performing a slip motion with respect to the inner portion of the joint outer part; wherein a pressurizing space is formed to be surrounded by the outer portion, the end connection portion, and the inner portion of the joint outer part, the inner portion includes a packing portion at a region thereof spaced apart from the end connection portion, the inner portion further includes an inner crimped portion including at least one crimp bent in a crimped shape between the end connection portion and the packing portion, and an adhesion between the inner portion and the slip inner part increases due to a pressure of a conveyed fluid, the pressure being applied via the pressurizing space, and the inner crimped portion is elastically deformed when the slip inner part moves in up, down, left, and right directions, so that the conveyed fluid does not leak to the outside.

The inner crimped portion may include an elastic material and at least two crimps extending from the center of the joint outer part toward an outside of the joint outer part and bending again toward the center of the joint outer part.

The packing portion may include a groove portion formed along a circumference and a packing member provided in the groove portion, and the inner portion may further include guide packing portions at both sides of the packing portion with the packing portion between the guide packing portions.

The end connection portion may include an end crimped portion including at least one end crimp formed to be bent in a crimped shape.

The end crimped portion may include an elastic material and at least two end crimps extending toward the inside of the joint outer part and bending again toward an outside of the joint outer part.

The inner crimped portion of the inner portion may be spaced apart from an external surface of the slip inner part before the inner crimped portion is elastically deformed.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
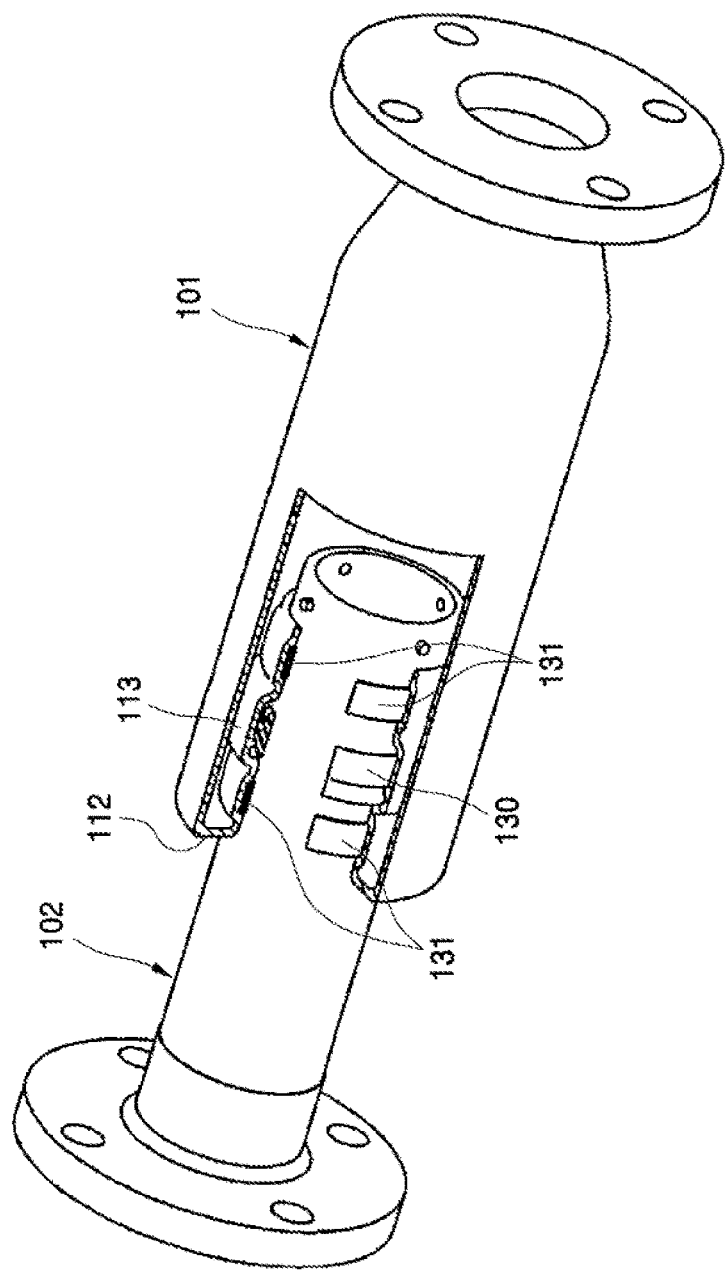
FIGS. 1 and 2 are views for describing a conventional slip joint.
Figure 2:
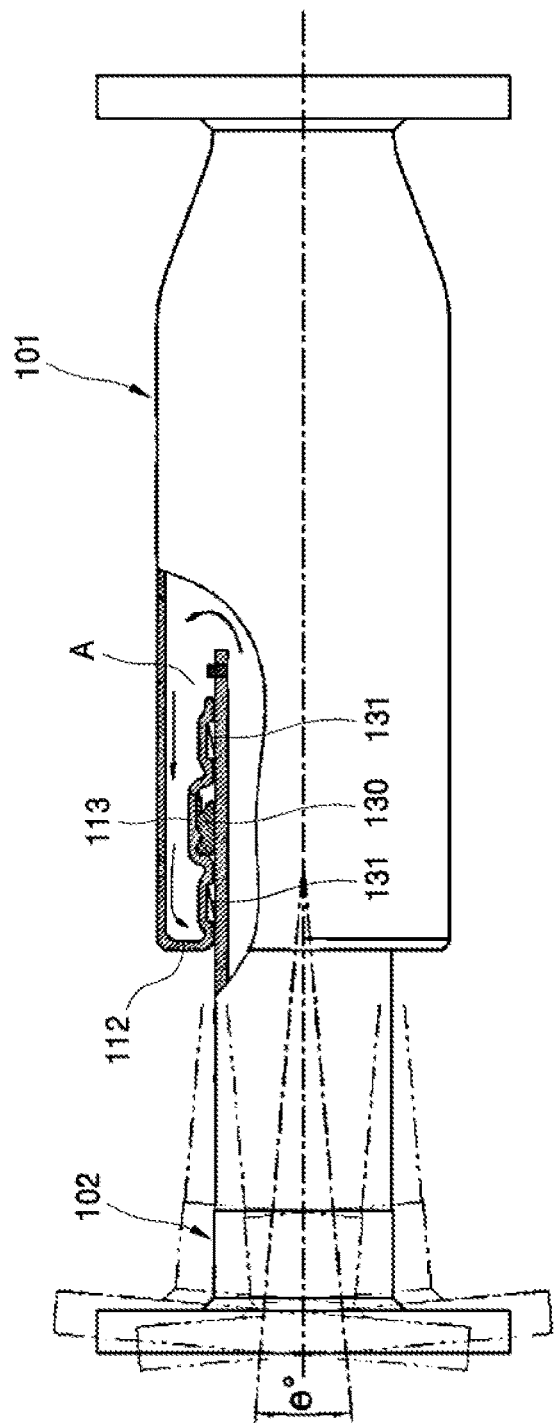

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Hereinafter, an earthquake-resistant flexible slip joint apparatus 1 according to an embodiment will be described in detail by referring to FIGS. 3 and 4.

Figure 3:
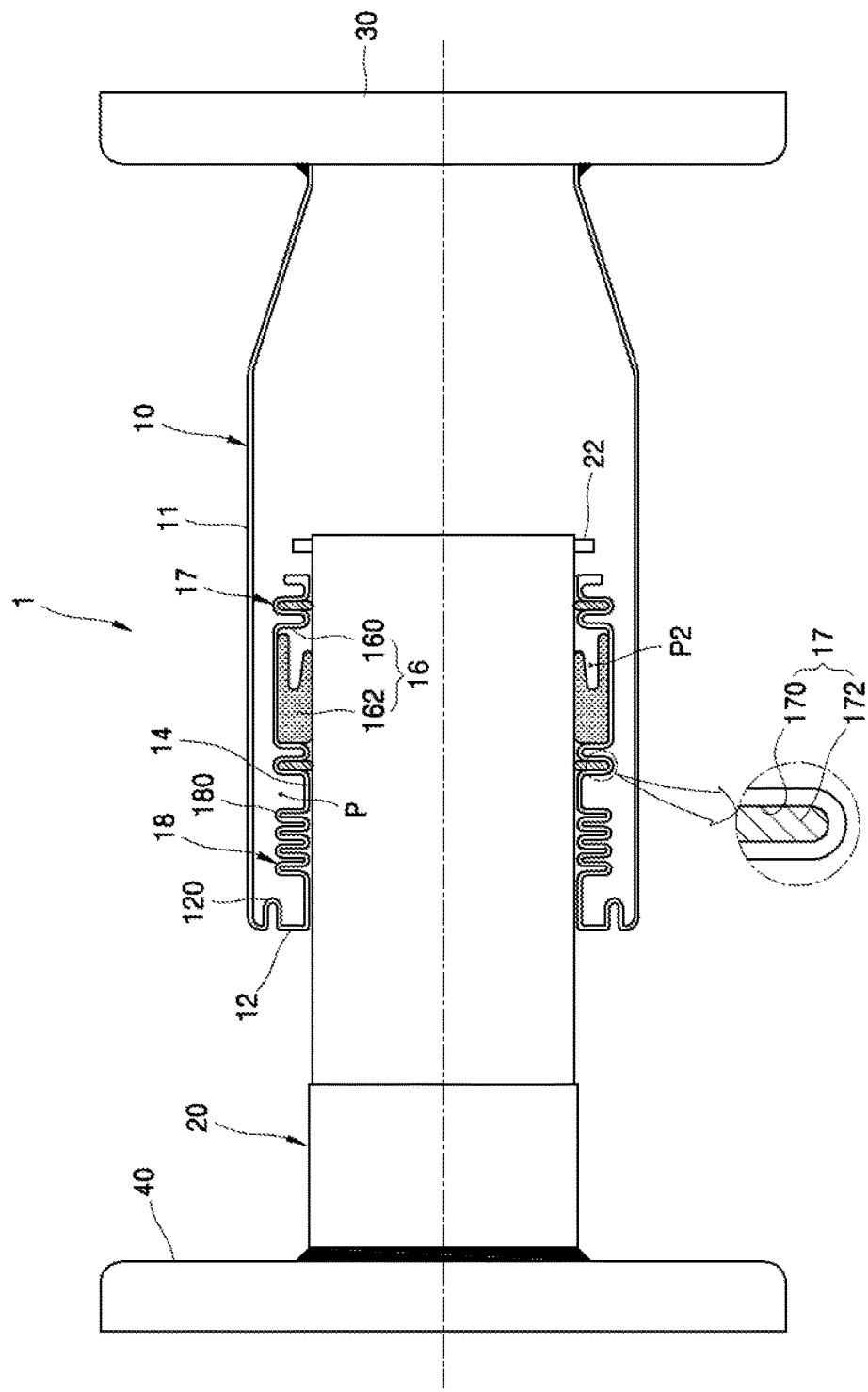
FIG. 3 is a longitudinal cross-sectional view of an earthquake-resistant flexible slip joint apparatus according to an embodiment.

FIG. 3 is a cross-sectional view of the earthquake-resistant flexible slip joint apparatus 1 according to an embodiment.

The earthquake-resistant flexible slip joint apparatus 1 according to the present disclosure is an apparatus configured to allow deformation and movement of a pipe connection portion.

The earthquake-resistant flexible slip joint apparatus 1 according to the present embodiment may include a joint outer part 10 and a slip inner part 20.

An outer part flange 30 may be provided at an end of the joint outer part 10.

The joint outer part 10 may be mounted on a pipe and connected to another pipe via the flange 30. However, according to embodiments, the structure of an end of the joint outer part 10 may vary, in addition to the case in which a flange is provided at the end.

The joint outer part 10 may include an outer portion 11 at an end thereof, an end connection portion 12, and an inner portion 14 at another end thereof.

That is, referring to FIG. 3, the joint outer part 10 may include the outer portion 11 extending in a left direction, the end connection portion 12 extending from a leftmost end of the outer portion 11 and being bent toward a center of a pipe member, and the inner portion 14 extending from the end connection portion 12 and being bent again in a right direction toward the inside thereof.

In other words, the joint outer part 10 has approximately a "⊏" shape with the other end bent toward the inside thereof, wherein the slip inner part 20 is inserted into the bent portion to be capable of performing a slip motion and up, down, left, and right movements.

A rightmost end of the inner portion 14 is a free end. Also, the outer portion 11 has a cylindrical shape, which is a general shape of a pipe member. The term "center" denotes a center of a circle, which is a sectional shape of the pipe member.

The joint outer part 10 includes a metal material having elasticity. According to the present embodiment, the outer portion 11, the end connection portion 12, and the inner portion 14 are integrally formed with one another, and curved surfaces connect the outer portion 11, the end connection portion 12, and the inner portion 14 with one another.

An inner space of the joint outer part 10, the inner space being surrounded by the outer portion 11, the end connection portion 12, and the inner portion 14, is a pressurizing space P. A conveyed fluid generates a pressurizing force in the pressurizing space P and thus a packing portion 16 of the inner portion 14 is adhered to an external surface of the slip inner part 20. Accordingly, leakage of the conveyed fluid is prevented between the slip inner part 20 and the inner portion 14 of the joint outer part 10.

The inner portion 14 includes the packing portion 16 at a region thereof separated from the end connection portion 12. The packing portion 16 prevents leakage of the conveyed fluid through a gap between the inner portion 14 and the slip inner part 20. Referring to FIG. 3, the packing portion 16 is provided at the free end of the inner portion 14, which is the rightmost side.

Figure 4:
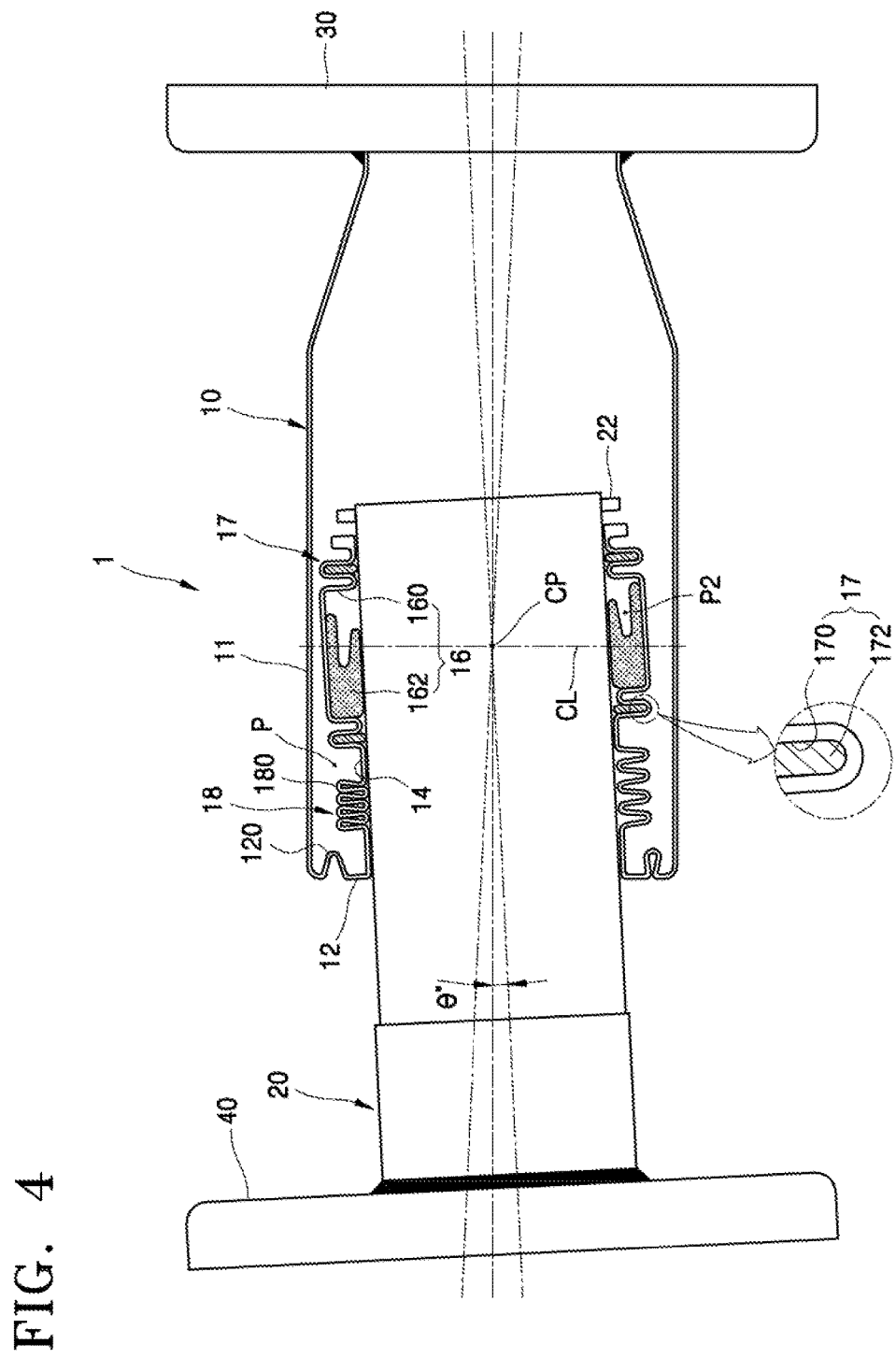
FIG. 4 is a view for describing a case in which a slip inner part illustrated in FIG. 3 moves in up and down directions.

Referring to FIG. 4, the packing portion 16 may be located on a central line CL crossing a central point CP of a movement of the slip inner part 20, when the slip inner part 20 moves in up, down, left, and right directions. Based on this arrangement, an inner crimped portion 18 may be elastically deformed without restriction, so that large movements in up, down, left, and right directions of the slip inner part 20 may be effectively sustained with without damage to the joint outer part 10.

According to the present embodiment, the packing portion 16 may include a groove portion 160 and a packing member 162 provided in the groove portion 160. The groove portion 160 may be formed along a circumference of the inner portion 14 in a shape to accommodate the packing member 162.

The packing member 162 has a shape of a pressed "C", and has an inflation space P2 formed therein. When the conveyed fluid leaks through the gap between the inner portion 14 and the slip inner part 20, the leaked fluid reaches the inflation space P2 and inflates the packing member 162. External surfaces of the inflated packing member 162 may pressurize the groove portion 160 to generate strong adherence, thereby preventing leakage of the conveyed fluid to the outside. According to another embodiment, the packing member 162 may be provided in various known forms, such as a simple O-ring.

In addition, the inner portion 14 may further include guide packing portions 17 at both sides of the packing portion 16 with the packing portion 16 therebetween. Each guide packing portion 17 may include a guide packing groove portion 170 and a guide packing member 172. The guide packing portion 17 may guide a linear slip motion of the slip inner part 20 in the joint outer part 10.

The inner portion 14 may include an inner crimped portion 18 including crimps 180 which are bent in a crimped shape between the end connection portion 12 and the packing portion 16.

According to the present embodiment, the inner crimped portion 18 may include four crimps 180. Each crimp 180 may extend from the center of the joint outer part 10 toward an outside of the joint outer part 10 and again may bend toward the center. However, shapes of the "crimps" are not limited to their names or the embodiment illustrated in FIG. 3, and sizes of the crimps, distances among the crimps, and whether the crimps have the same size may be implemented in various ways according to necessity. Generally, a "crimp" means a wave shape or a bellows shape.

According to embodiments, the number of crimps may vary. That is, according to necessity, one crimp or two crimps may be formed, or at least five crimps may be formed. Also, the total length of the inner crimped portion 18 may vary according to necessity.

As illustrated in FIG. 4, the inner crimped portion 18 may be elastically transformed when the slip inner part 20 moves in up, down, left, and right directions, in order to sustain the movements of the earthquake-resistant flexible slip joint apparatus 1. Accordingly, air tightness at the packing portion 16 is maintained, and thus, the conveyed fluid does not leak to the outside.

According to the present embodiment, before the inner crimped portion 18 is elastically deformed, the inner crimped portion 18 is spaced apart from the external surface of the slip inner part 20. That is, before the slip inner part 20 moves in up, down, left, and right directions in response to an external force applied thereto, the inner crimped portion 18 does not contact and is slightly apart from the external surface of the slip inner part 20. Based on this structure, when the external force is applied to the slip inner part 20, the inner crimped portion 18 is easily elastically deformed without restriction.

Also, according to the present embodiment, the end connection portion 12 may include an end crimped portion 120. The end crimped portion 120 may include an elastic material and one end crimp formed to be bent in a crimped shape. In detail, the end crimp has a shape in which the end crimp extends toward an inside of the joint outer part 10 (referring to FIG. 3, toward a right side) and again bends toward an outside of the joint outer part 10 (toward a left side).

According to another embodiment, the end crimped portion 12 may include at least two end crimps. According to embodiments, the end crimped portion 12 may include no end crimp.

The slip inner part 20 is a cylindrical-shaped pipe member mounted to be capable of performing a slip motion with respect to the inner portion 14 of the joint outer part 10. An inner part flange 40 may be provided at an end of the slip inner part 20. The slip inner part 20 may be connected to another pipe via the flange 40. However, according to embodiments, the structure of an end of the slip inner part 20 may vary, in addition to the case in which a flange is included at the end of the slip inner part 20.

A stopper 22 may be provided at the other end of the slip inner part 20. The stopper 20 prevents the slip inner part 20 from detaching from the joint outer part 10.

Hereinafter, operational effects of the earthquake-resistant flexible slip joint apparatus 1 according to an embodiment will be described.

According to the earthquake-resistant flexible slip joint apparatus 1 having the structure described above, the slip inner part 20 is inserted into the inner portion 14 of the joint outer part 10 having an end bent toward the inside of the joint outer part 10, the packing portion 16 is included between the slip inner part 20 and the inner portion 14, the packing portion 16 may be pressurized by a conveyed fluid through the pressurizing space P, and the inner crimped portion 18 and the end crimped portion 120 are provided. Accordingly, not only a slip motion of the slip inner part 20, which is a relative motion against the joint outer part 10, but also up, down, left, and right movements of the slip inner part 20 may be allowed without any damage or leakage of the conveyed fluid.

Particularly, when the slip inner part 20 moves in up, down, left, and right directions, since the inner crimped portion 18 and the end crimped portion 120 are flexible and thus can expand or contract based on situations, as illustrated in FIG. 4, large movements of the slip inner par 20 may also be supported.

That is, when the slip inner part 20 performs a relative rotational motion of θ degrees with respect to the joint outer part 10, based on a rotational center CP illustrated in FIG. 4, the lower inner crimped portion 18 expand and the upper inner crimped portion 18 contracts, while the upper end crimped portion 120 expand and the lower end crimped portion 120 contracts, so that the relative motion of the slip inner part 20 is effectively allowed.

Accordingly, damage to the joint outer part 10 or leakage of the conveyed fluid may be prevented even in a situation in which a large motion, such as an earthquake, occurs, and safety is thus guaranteed.

According to the conventional art, when up, down, left, and right movements of the slip inner part 20, as the relative motion of the sip inner part 20 with respect to the joint outer part 10, are repeatedly performed, stress is accumulated in one spot, which may cause fatigue fracture at the spot. However, according to the present disclosure, since the inner crimped portion 18 and the end crimped portion 120 expand or contract, stress is distributed and fatigue fracture is significantly reduced.

Also, even when only the inner crimped portion 18 is included in the earthquake-resistant flexible slip joint apparatus 1, it is possible to deal with a larger relative motion of the slip inner part 20 than in the conventional art, and when the end crimped portion 120 is also included in the earthquake-resistant flexible slip joint apparatus 1, a larger relative motion of the slip inner part 20 may be allowed than in the case when the only the inner crimped portion 18 is included.

According to the present embodiment, since the inner crimped portion 18 does not contact and is apart from the slip inner part 20, and the packing portion 16 is arranged at the end of the inner portion 14, up, down, left, and right movements of the slip inner 20 may be more smoothly sustained.

As described above, according to the one or more of the above embodiments of the earthquake-resistant flexible slip joint apparatus 1, leakage of the conveyed fluid through the gap between the slip inner part 20 and the inner portion 14 may be effectively prevented since the pressure of the conveyed fluid allows the slip inner part 20 and the inner portion 14 to adhere to each other via the pressurizing space P. Also, when large up, down, left, and right movements of the slip inner part 20 occur against the joint outer part 10 due to external forces such as an earthquake, and when the up, down, left, and right movements repeatedly occur due to repeatedly applied external forces, the inner crimped portion 18 is elastically deformed to allow these movements, thereby preventing leakage of the conveyed fluid.

In addition, when the end crimped portion 120 is also included in the end connection portion 12, large and repetitive up, down, left, and right movements of the slip inner part 20 may be more effectively allowed than in the case when the end crimped portion 120 is not included in the end connection portion 12, so that leakage of the conveyed fluid may be prevented.

It should be understood that the embodiments described herein should be considered in a descriptive sense only and not for purposes of limitation. Descriptions of the features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. An earthquake-resistant flexible slip joint apparatus comprising:
a joint outer part comprising an outer portion having a cylindrical shape, an end connection portion extending from an end of the outer portion toward a center of the joint outer part, and an inner portion extending from an end of the end connection portion toward an inside of the joint outer part and having a free end; and
a slip inner part having a cylindrical shape and mounted to be capable of performing a slip motion with respect to the inner portion of the joint outer part;
wherein a pressurizing space is formed to be surrounded by the outer portion, the end connection portion, and the inner portion of the joint outer part,
the inner portion comprises a packing portion at a region thereof spaced apart from the end connection portion,
the inner portion further comprises an inner crimped portion comprising at least one crimp bent in a crimped shape between the end connection portion and the packing portion, and
an adhesion between the inner portion and the slip inner part increases due to a pressure of a conveyed fluid, the pressure being applied via the pressurizing space, and the inner crimped portion is elastically deformed when the slip inner part moves in up, down, left, and right directions, so that the conveyed fluid does not leak to the outside.

2. The earthquake-resistant flexible slip joint apparatus of claim 1, wherein the inner crimped portion comprises an elastic material and at least two crimps extending from the center of the joint outer part toward an outside of the joint outer part and bending again toward the center of the joint outer part.

3. The earthquake-resistant flexible slip joint apparatus of claim 1, wherein the packing portion comprises a groove portion formed along a circumference and a packing member provided in the groove portion, and
the inner portion further comprises guide packing portions at both sides of the packing portion with the packing portion between the guide packing portions.

4. The earthquake-resistant flexible slip joint apparatus of claim 1, wherein the end connection portion comprises an end crimped portion comprising at least one end crimp formed to be bent in a crimped shape.

5. The earthquake-resistant flexible slip joint apparatus of claim 4, wherein the end crimped portion comprises an elastic material and at least two end crimps extending toward the inside of the joint outer part and bending again toward an outside of the joint outer part.

6. The earthquake-resistant flexible slip joint apparatus of claim 1, wherein the inner crimped portion of the inner portion is spaced apart from an external surface of the slip inner part before the inner crimped portion is elastically deformed.

* * * * *